Sept. 11, 1945.  L. A. TROFIMOV  2,384,776
POWER TRANSMISSION UNIT WITH LOAD SPEED AND DIRECTION CONTROL
Filed March 26, 1942  3 Sheets-Sheet 1

INVENTOR.
Lev A. Trofimov
BY Harry P. Canfield
Attorney

Sept. 11, 1945.  L. A. TROFIMOV  2,384,776
POWER TRANSMISSION UNIT WITH LOAD SPEED AND DIRECTION CONTROL
Filed March 26, 1942  3 Sheets-Sheet 2
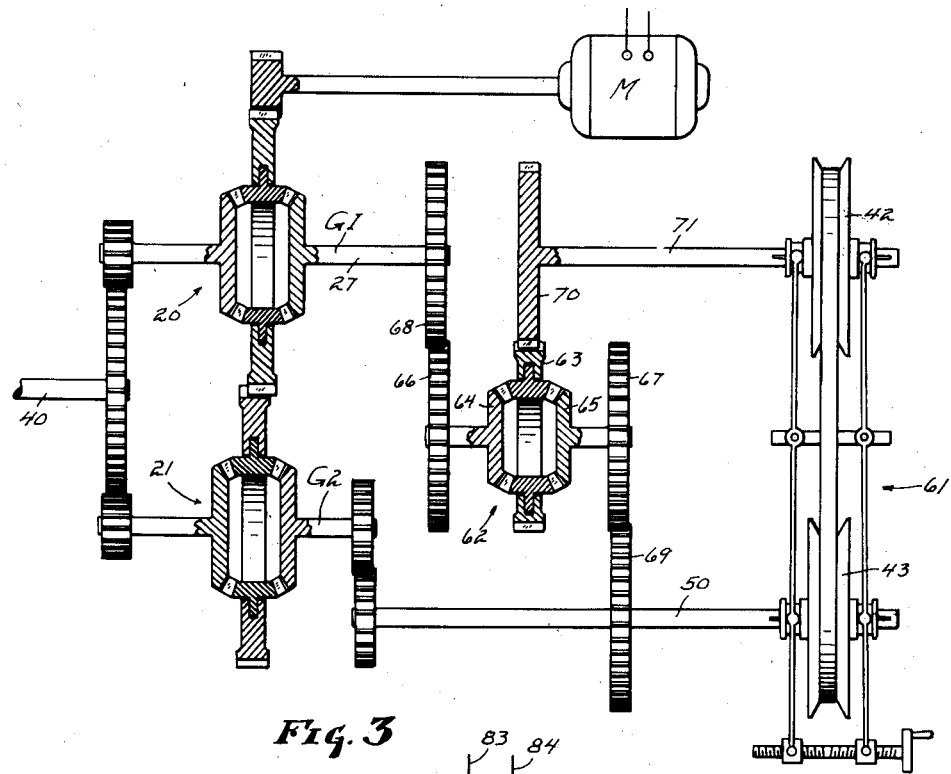
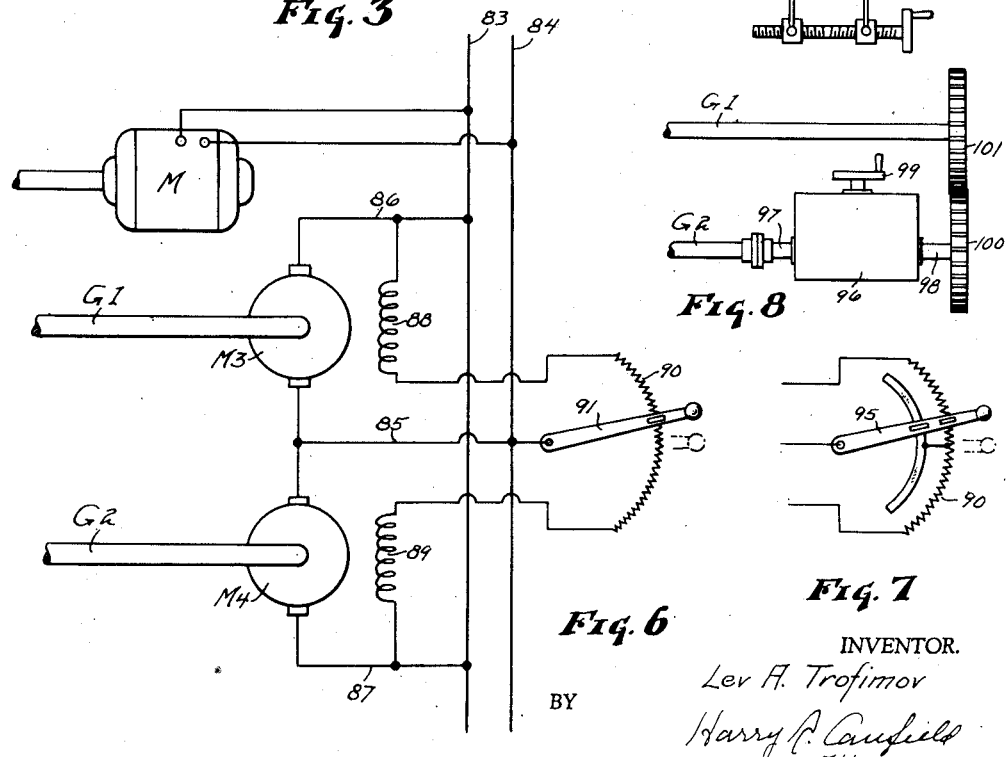
INVENTOR.
Lev A. Trofimov
Harry A. Canfield
Attorney Sept. 11, 1945.  L. A. TROFIMOV  2,384,776
POWER TRANSMISSION UNIT WITH LOAD SPEED AND DIRECTION CONTROL
Filed March 26, 1942   3 Sheets-Sheet 3
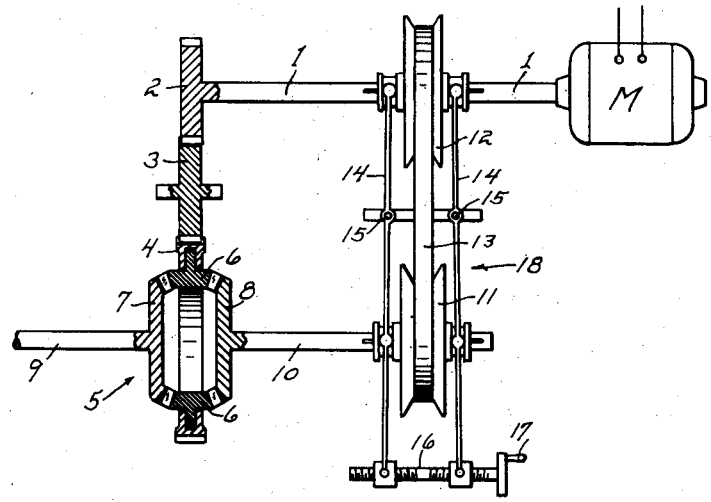
Fig. 9
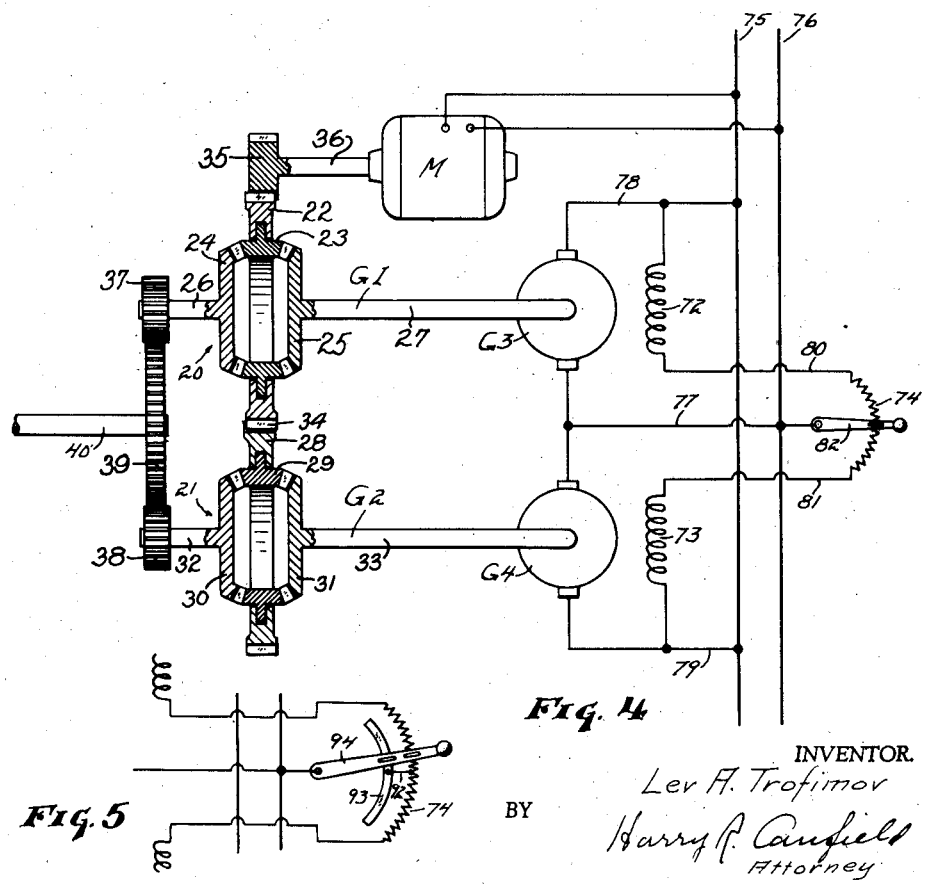
Fig. 4
Fig. 5
INVENTOR.
Lev A. Trofimov
BY Harry P. Canfield
Attorney Patented Sept. 11, 1945

2,384,776

UNITED STATES PATENT OFFICE 2,384,776

POWER TRANSMISSION UNIT WITH LOAD SPEED AND DIRECTION CONTROL

Lev A. Trofimov, Willoughby, Ohio

Application March 26, 1942, Serial No. 436,309

35 Claims. (Cl. 74—286)

This invention relates to power transmissions of the class in which power from a power source is transmitted to a load, to drive it in forward or in reverse direction, or bring it to rest; and relates particularly to transmissions of this class which utilize the properties of differential gearing, that is to say gearing comprising, conventionally, as the principal elements thereof, a spider rotatably supporting one or more pinion gears, and differential gears meshed with the pinions.

It has been proposed heretofore to utilize differential gearing to transmit power to a load at variable speed; and the source power has been variously applied to one of the differential elements and delivered by another of the elements; and various means have been proposed to vary the speed of the power delivering element by varying the relative speeds of the other two elements.

In all such prior transmissions however of which I am aware, particularly those which are adjustable to drive the load in either the forward or reverse direction or bring it to rest, loss of power has rendered them inefficient; and the controls for varying the speed of the load and reversing it and bringing it to rest have been complicated, expensive, inefficient and unreliable; and in some instances such transmissions have been unavoidably asymmetrical, that is to say, have transmitted power with tolerable efficiency in one direction, but at great loss of power and corresponding inefficiency in the other direction, or when the load is brought to rest.

It is among the objects of the present invention:

To provide generally an improved power transmission with load speed and direction control;

To provide generally a power transmission by which a load may be driven in either of two directions or brought to rest in an improved manner;

To provide a differential gearing type of power transmission for driving a load from a power source, and by which the direction and speed of the load may be varied in an improved manner;

To provide a differential gearing type of power transmission for driving a load from a power source comprising improved control means for determining the speed and direction of the driven load, and having improved efficiency, durability, flexibility and convenience of control.

Other objects will be apparent to those skilled in the art to which my invention appertains.

My invention is fully disclosed in the following description taken in connection with the accompanying drawings in which, Fig. 1 is a view, somewhat diagrammatic, illustrating an embodiment of my invention;

Figs. 2 and 3 are views similar to Fig. 1 illustrating modifications;

Fig. 4 is a view generally similar to Fig. 1, but illustrating another embodiment of my invention;

Fig. 5 is a view illustrating a modification of the embodiment of Fig. 4;

Fig. 6 is a fragmentary view generally similar to a part of Fig. 1 but illustrating another embodiment;

Fig. 7 is a view illustrating a modification of Fig. 6;

Fig. 8 is a fragmentary view similar to a part of Fig. 1 illustrating a modification;

Fig. 9 is a view illustrating prior practice in the art to which the present invention appertains.

According to the invention herein disclosed, provision is made to drive a load by power from a motor, and the load may be brought to rest or driven at variable speed in forward or reverse direction, by varying the relative speed of two differential gearing elements in an improved manner.

Figure 1:
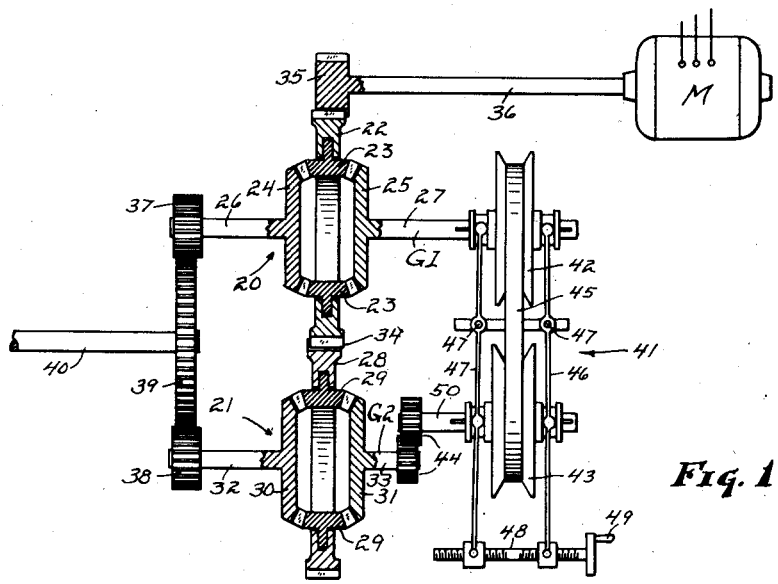

In Fig. 1 of the drawings is illustrated one means for varying the relative speed of two differential gearing elements for this purpose, the means in Fig. 1 comprising a variable speed-ratio transmission device of the type known commercially as a "Reeves" drive, comprising in general two pulleys connected by a belt running thereon, and the pulleys being constructed so that the diameter of one may be increased and that of the other decreased and vice versa.

In general, transmissions have heretofore been proposed in which the speed and direction of a load, driven by a motor, may be adjustably varied by a differential gearing associated with a variable speed-ratio transmission device such as a Reeves drive; and it is therefore believed that a better understanding of the improvements effected by the invention herein disclosed will be had by first considering such prior transmissions and the objections thereto and the defects inherent therein.

Such a prior power transmission is illustrated in Fig. 9, wherein I have illustrated at M a motor, the shaft 1 of which is connected through meshed gears 2 and 3 to the spider 4 of a differential gearing shown generally at 5, the spider 4 having teeth meshed with the teeth of the gear 3. The spider 4 rotatably supports pinion gears 5—5 with which are meshed side gears 7 and 8. The load shaft 9 is connected to the side gear 7. The side gear 8 is connected to a shaft 10 upon which is mounted one of the pulleys 11 of a Reeves drive, designated generally as 18 the other pulley 12 thereof being mounted on the shaft 1 of the motor. The pulleys 11 and 12 are connected by a belt 13. The diameters of the pulleys 11 and 12 may be changed by levers 14—14 upon rocking them around pivots 15—15 by means of a reversely threaded screw 16 which may be turned by a handle 17 to rock the levers in opposite directions. The belt and pulley variable ratio transmission device thus provided, is diagrammatically shown in the drawings and will be recognized by those skilled in the art as a Reeves type of drive; and it is believed that a further illustration or description thereof will be unnecessary.

It will be noted that the variable speed ratio device 18 changes the relative speed of the spider 4 and side gear 8. In the drawings, the pulleys 11 and 12 have been shown as adjusted to the same diameter, and the spider 4 has been shown as geared to run at one half of the speed of the shaft 1 and pulley 12, and at this adjustment, the load shaft 9 remains at rest.

If the ratio of the device 18 be changed by adjustment so that the pulley 11 revolves slower than the pulley 12, the load shaft 9 will rotate in one direction, say the forward direction; and if the ratio of the device 18 be adjusted to cause the pulley 11 to run faster than the pulley 12, the load shaft 9 will be driven in the reverse direction.

Thus forward and reverse and zero speeds of the load shaft 9 are attainable by adjustment of the device 18.

When the load is at rest, the two pulleys 11 and 12 are of equal diameter. When the load is driven in the forward direction the pulley 12 is smaller than the pulley 11. When the load is driven in the reverse direction the pulley 12 is larger than the pulley 11. It follows that for forward speeds of the load, power is transmitted through the belt 13 from the pulley 11 to the pulley 12, and, in reverse direction of the load, power is transmitted through the belt 13 from the pulley 12 to the pulley 11.

Thus at forward speeds of the shaft 9, power from the motor M and shaft 1 flows so to speak, in parallel paths, part of the power going from the shaft 1 through the spider 4 and side gear 7 to the shaft 9, and part flowing from the shaft 1 through the spider 4 to the side gear 8, to pulley 11, through the belt 13 to the pulley 12 to shaft 1; and at reverse speeds of the shaft 9, part of the power from the shaft 1 flows from shaft 1, through the belt 13, to side gear 8 to side gear 7, to load shaft 9, and part flows from side gear 8 through spider 4 to shaft 1.

In both instances there is a circulation of power in the belt path. In the full speed forward direction this circulating power is equal to the power supplied to the load; but in the full speed reverse direction, as can be demonstrated, this circulating power is equal to double the power supplied to the load.

It is this last-named circulation of power which, for reverse speeds of the load shaft, makes this arrangement inefficient and introduces a loss of power. This can be demonstrated by the readings of a watt meter in the supply circuit to the motor M. With a given load on the load shaft 9, then for forward speeds and down to zero speed of the shaft 9, the power supplied to the motor M corresponds in general to the power delivered at the shaft 9; but for reverse speeds of the shaft 9, the power delivered to the motor M begins to increase and for greater and greater reverse speeds becomes greater and greater, and at all reverse speeds is greater than the power delivered to the shaft 9 at corresponding forward speeds.

Also, for forward direction of the load, the belt and pulley device must be of sufficient size to transmit full load; and for reverse direction it must be of sufficient size to transmit three times the full load.

The arrangement therefore may be spoken of as asymmetrical, performing differently for forward speeds of the load as compared with reverse speeds, there being inherent in it very low efficiency and great loss of power for reverse speeds as compared with the efficiency of forward speed transmission, whatever the latter efficiency may be; and the device must be of large power rating and therefore expensive and inefficient.

It is among the advantages of the present invention that the loss of power referred to above is completely avoided, and that embodiments of the invention to be described supply power to the load shaft with equal efficiency in both the forward and reverse directions.

Referring to Fig. 1 of the drawings wherein is illustrated one embodiment of my invention, I have shown generally at 20 and 21, two differential gearings. The gearing 20 comprises a spider 22 rotatably supporting pinions 23—23, any suitable number of which may be provided, meshed with rotatable side gears 24 and 25 which are connected respectively to shafts 26 and 27, the latter for clarity of disclosure hereinafter being identified as the shaft G1.

The differential gearing 21 similarly comprises a spider 28, pinions 29—29, side gears 30 and 31 meshed therewith, and connected respectively to shafts 32 and 33, the latter shaft being identified hereinafter as the shaft G2.

The two spiders 22 and 28 have teeth on their peripheries meshed together as at 34; and the spider 22 is driven by a pinion 35 meshed therewith and connected to the shaft 36 of a motor M.

The shafts 26 and 32 are connected respectively to pinions 37 and 38 both of which mesh with a gear 39 connected to the load shaft 40.

The spiders 22 and 28 are thus driven in opposite directions, and for convenience of description they have been shown and will be considered as of the same diameter, so that they run in opposite directions at equal speeds. The side gears 24—25 and 30—31 are also for convenience and simplicity of description chosen as of the same diameter. The pinions 37 and 38 are also of the same diameter for like reasons.

Now with this double differential arrangement as shown it will be observed that if the shafts G1 and G2 are caused or allowed to rotate at the same speed and in opposite directions, the load shaft 40 will remain at rest; and that if the shaft G1 rotates slower than the shaft G2 the load shaft 40 will rotate in one direction, say the forward direction; and if the shaft G1 rotates faster than the shaft G2, the load shaft 40 will rotate in the other or reverse direction; and that the speed of the load shaft 40 in either direction will be determined by the relative speeds of the shafts G1 and G2.

In this connection it may be added that for any forward or reverse speed of the load shaft 40, there is a definite relative speed at which the oppositely rotating shafts G1 and G2 will rotate; and that similarly for any speed of one of the shafts (say the shaft G1), there is a definite speed at which the other shaft (G2) will run, and a definite, forward or reverse speed at which the load shaft 40 will run; this resulting from the interconnection between the shafts G1, G2 and the load shaft 40, effected by the intermeshed gears of the arrangement; and that this predetermined relation of speeds is such that if the speed of the G1 shaft, for example, be decreased 50%, the corresponding speed of the shaft G2 will be increased by 50%. Also, this relation of speeds of the shafts G1 and G2 is such that the sum of their individual speeds is a constant. For example if their speeds are each 100 revolutions per minute with the load shaft at rest, and if for a forward speed of the load shaft, the speed of the shaft G1 is reduced to 50 revolutions per minute, the corresponding speed of the shaft G2 will be 150 revolutions per minute, the sum in both instances being 200.

In order to attain the end result contemplated by this invention, which is to drive the load shaft 40 by the motor M in either direction, forward or reverse, or to bring it to rest, and, when desired, to adjustably vary the forward or reverse speed of the load shaft 40, it will be apparent that this end result may be accomplished by any means associated with the shafts G1 and G2 by which their relative speed may be changed, provided that such means is such that for any increased speed of one shaft (G1 or G2) the other shaft (G2 or G1) will have a corresponding decreased speed.

In the embodiment of my invention illustrated in Fig. 1, these corresponding relative speeds of the shafts G1 and G2 are controlled by a variable speed-ratio device shown generally at 41, which, as will be seen, is a drive of the so-called Reeves type. It comprises a pulley 42 on the shaft G1 and a pulley 43 connected to the shaft G2 through meshed gears 44, the pulleys being connected together by a belt 45 running thereon. (If a crossed belt were practicable, the gears 44 would not be needed.) The relative diameters of the pulleys 42 and 43 are adjustable by levers 46—46 pivotally supported at 47—47 and rockable in opposite directions around their pivots 47 by a reversely threaded screw 48 which may be turned by a handle 49. The device 41 is illustrated somewhat diagrammatically in the drawings but inasmuch as it corresponds in general with the Reeves type of drive and will be recognized as such by those skilled in art, it is thought that further illustration or description thereof is unnecessary.

For convenience the pulleys 42 and 43 have been shown as adjusted to equal diameters, and the meshed gears 44 as having equal diameters, and therefore, in the adjustment of the device 41 illustrated, the shafts G1 and G2 will be caused to rotate at the same speed and the load shaft 40 will remain at rest.

Upon adjusting the device 41 to change the relative diameters of the pulleys 42 and 43, the shafts G1 and G2 will rotate at different speeds to cause the load 40 to be driven in the forward or reverse direction and at a speed in either direction determined by the relative diameters of the pulleys 42 and 43, whereby the load shaft 40 may be driven in either direction at any desired speed or brought to rest by turning the handle 49.

When the shaft G1 rotates slower than the shaft G2, power from the motor shaft 36 to the spider 22 divides, part flowing through the shaft 26 to the load shaft 40, and part flowing to the shaft G1 through the belt 45 to the shaft G2, and there, reacting upon the spider 28, flows through the shaft 32 to the load shaft 40. When the shaft G2 rotates slower than the shaft G1, power from the motor shaft 36 is transmitted to the spider 28 through the spider 22 and there divides, part flowing through the shaft 32 to the load shaft 40, and part flowing to the shaft G2 thence through the belt 45 to the shaft G1 and there, reacting on the spider 22, flows through the shaft 26 to the load shaft 40.

When the load shaft 40 is delivering power, supplied by the motor M, all of the power of the motor M is transmitted to the shaft 40 except that of incidental friction losses, and this is true in both directions and at all speeds of the shaft 40; and there is no internal circulation of power through the belt 45 and the differential gearing to absorb and waste power and reduce the efficiency of the transmission, as is known to be true of prior differential gearing transmissions associated with the Reeves type of speed-ratio changing device.

With this arrangement furthermore only a part of the power is transmitted through the belt and pulley device. It can be demonstrated that even at the full load rating of the drive, only 75% of the full load power goes through the belt. For example when ten horsepower is being transmitted to the load, only 7½ horsepower will be transmitted through the variable speed-ratio device. A smaller, cheaper and more efficient device 41 is thereby made possible.

Figure 2:
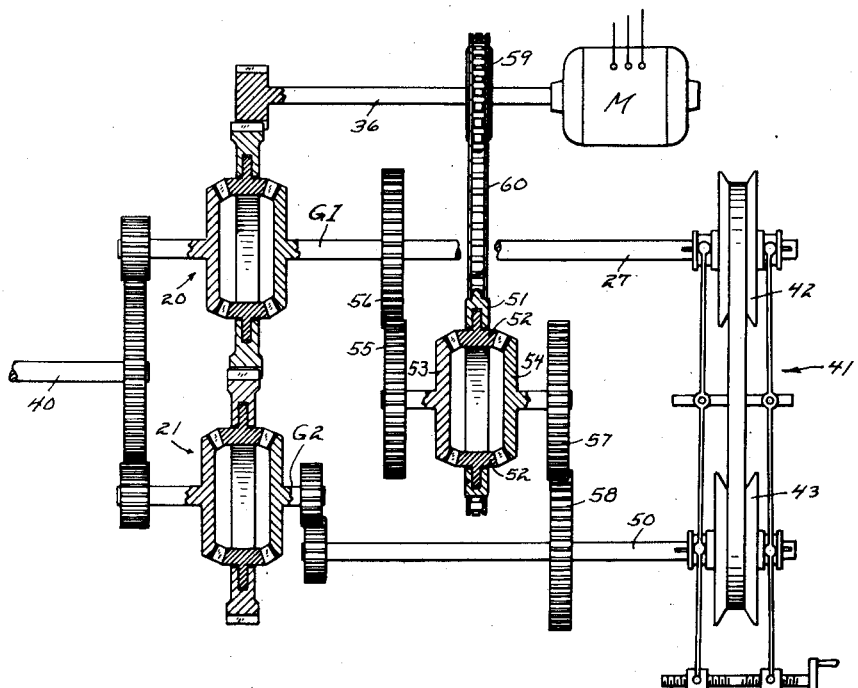

In Fig. 2 is illustrated a modification of the arrangement of Fig. 1. With the arrangement of Fig. 1, if the relative diameters of the pulleys 42 and 43 be suddenly changed, there will be a short period of time during which acceleration, or deceleration as the case may be, of the parts in rotation to bring them to their new speeds, may call for such great traction between the belt 45 and the pulleys 42 and 43 as to cause slippage thereat; and in cases in which, due to the size and inertia of the load and the rotating parts this would be objectionable, the arrangement of Fig. 2 may be utilized to prevent it. This arrangement is the same as that of Fig. 1 except that the shafts 27 and 50 are connected by an intermediate differential gearing, the side gears of which rotate in the same direction as the spider. This intermediate differential comprises a spider 51 rotatably supporting pinions 52—52, and side gears 53 and 54 meshed with the pinions. The side gear 53 is connected to a gear 55 which is meshed with a gear 56 on the shaft G1. The side gear 54 is connected to a gear 57 meshed with a gear 58 on the shaft 50 which as stated rotates at the same speed as the shaft G2. The spider 51 has sprocket teeth on its periphery; and a sprocket wheel 59 is connected to the shaft 36; and a chain 60 connects the sprocket wheel 59 with the spider 51. For convenience of description, the gears 55, 56, 57, 58 are all of the same size. To cause the side gears 53 and 54 and the spider 51 all to rotate in the same direction and at the same speed, when the shafts G1 and G2 rotate at the same speed, a suitable ratio between the sprocket wheel 59 and the spider 51 is provided.

In Fig. 3 is shown another modification using a Reeves type variable speed-ratio device. By means of this arrangement, the range of speed ratio adjustment by the belt and pulley device, which is shown generally at 61, need be only one third as great as the range for the arrangement of Fig. 1. Referring to Fig. 1 again, if we consider for example that full forward speed of the shaft 40 is attained when the shaft G1 rotates at the same speed as the spider 22, the diameters of the pulleys 42 and 43 will bear the ratio of one to three. For a like full speed in the reverse direction the diameters of the pulleys 42 to 43 will have the ratio of three to one. The total overall range of adjustment is therefore nine to one. With the arrangement of Fig. 3 this total over all range of adjustment is only three to one for the same range of speeds as will be explained. Because of this fact, the speed ratio device 61 of the form of Fig. 3 may be smaller and therefore less expensive and more efficient.

The arrangement of Fig. 3 has the shafts 50 and 27 and the double differential and power source of the form of Fig. 1. An intermediate differential gearing shown generally at 62 is provided comprising a spider 63, side gears 64 and 65 connected to gears 66 and 67 respectively. The gear 66 meshes with a gear 68 on the shaft 27. The gear 67 meshes with a gear 69 on the shaft 50. With the shafts G1 and G2 running at the same speed but in opposite directions as described, the side gears 64 and 65 and the spider 63 all run in the same direction. A gear 70 meshed with the spider 63 is connected to a shaft 71 upon which the pulley 42 of the Reeves drive is mounted. The other pulley 43 of the Reeves drive is connected to the shaft 50.

For convenience of description the gears 68, 66, 67, 69, 70 and the spider 63 have all been chosen as of the same diameter. It will be apparent therefore that the side gears 64 and 65 of the differential 62 run at the same speeds as the shafts G1 and G2.

As explained for Fig. 1, in order to have a certain total range of speed of the load shaft, the range of adjustment in the forward direction is one to three and in the reverse direction three to one, and the total over-all range of adjustment of the speeds of the shafts G1 and G2 is nine to one. Therefore for the same range of load speeds in Fig. 3, a like over-all total range of adjustment would be necessary as between the side gears 64 and 65 which are connected to the shafts G1 and G2. But it will be apparent that if the change of speed ratio be effected as between the side gear 65 and the spider 63, the range of adjustment for the same forward load speeds would have to be only one to one-and-one-half, and similarly the range of adjustment for the reverse load speeds would have to be only one-and-one-half to one, so that the total over-all range of adjustment would have to be only three to one. The arrangement of Fig. 3 provides such a three to one adjustment inasmuch as the Reeves drive 61 has its pulley 42 connected to the spider 63 and its pulley 43 connected to the side gear 65.

In the description of Fig. 1 it was shown that to drive the load shaft 40 in either forward or reverse direction or to bring it to rest, it was only necessary to vary the relative speeds of the shafts G1 and G2 while maintaining the above-described corresponding speed relationship; and it was stated that any means could be provided to effect this end result. In the foregoing, a Reeves type belt and pulley device has been shown as such means. In Fig. 4 is shown a means of a different type. The double differential arrangement 20—21 and the shafts G1 and G2 are here reproduced. On the shaft G1 is mounted the rotor of a generator G3 and on the shaft G2 is mounted the rotor of a similar generator G4. As an illustrative example, these generators may be direct current generators, and have energizing fields 72 and 73; and a field rheostat resistance 74 may be provided to vary their energizations relatively. A direct current system is accordingly provided comprising current supply mains 75 and 76 across which the motor M is connected, and the motor M in this instance may suitably be a constant speed shunt wound motor. The generators G3 and G4 are connected in opposition, having a common armature wire 77 connected to the main 76, the other sides of their armatures being connected by wires 78 and 79 to the main 75. The field 72 is connected at one end to the wire 78, and at the other end by a wire 80 to one end of the rheostat resistance 74; and the field 73 is connected at one end to the wire 79 and at the other end by a wire 81 to the other end of said resistance; and a movable rheostat arm 82, which may be moved in either direction over the resistance 74 is connected to the main 76.

With the rheostat arm 82 in the middle or in an intermediate position, the two fields 72 and 73 are equally energized with an intermediate amount of energization. The generators G3 and G4 driven by the shafts G1 and G2 therefore will develop equal loads and torques and the torques will equally resist rotation of the shafts G1 and G2 and cause them to rotate at the same speeds and cause equal and opposite torques to be applied to the load shaft 40 to hold it at rest.

If now the rheostat arm 82 be moved in either direction, it will strengthen the field of one generator and weaken that of the other and this will cause the torques thereof to be unequal, and this will cause the shafts G1 and G2 to rotate at different speeds and cause the torques applied on the load shaft 40 to be unequal and cause it to rotate in one direction or the other accordingly.

Thus the load shaft 40 may be caused to rotate in the forward or reverse direction by movement of the rheostat arm 82 in one direction or the other from a mid-point of the resistance 74, or brought to rest by returning the rheostat arm 82 to the middle position.

The power absorbed or developed by the generators G3 and G4 being supplied back to the supply mains 75 and 76, is not lost, and may be considered as supplied to the motor M, whereby the power efficiency of the arrangement as a whole is not reduced by the absorption of power by the generators G3 and G4.

In Fig. 6 is illustrated an arrangement similar to that of Fig. 4 except that here instead of generators, motors M3 and M4 are utilized having their rotors connected to the shafts G1 and G2 as another means to vary their relative speeds. The motor M is connected across supply mains 83 and 84. The motor M3 and M4 have a common wire 85 to the line 84, and are connected by respective wires 86 and 87 to the main 83. The fields 88 and 89 of the motors are connected at one end to the main 83 and at their other ends are connected to the ends of a field rheostat resistor 90 having a rheostat arm 91 connected to the main 84. With the rheostat arm 91 in an intermediate position on the resistor 90, the two motors M3 and M4, which may be shunt wound motors, will run at equal speeds causing the shafts G1 and G2 to run at equal speeds and causing the load shaft 40, see Fig. 4, to remain at rest. By moving the rheostat arm 91 in one direction or the other, the motors M3 and M4 will be caused to run at different speeds whereby the load shaft may be caused to rotate in the forward or the reverse direction.

In this case the motors M3 and M4 supply the power to the load shaft and the motor M operates as a generator and transmits back to the supply lines, the power which drives it.

Obviously, considering both the forms of Fig. 4 and Fig. 6, there may be cases in which it is desirable for the electrodynamic unit M to operate optionally as either a motor (Fig. 4) or as a generator (Fig. 6) and for the electrodynamic units connected to the shafts G1 and G2 to operate optionally either as motors (Fig. 6) or as generators (Fig. 4); it being thought that this alternative mode of operation of Fig. 4 or of Fig. 6 will be apparent to those skilled in the art without complicating the disclosure by illustrating and describing it in detail.

In Fig. 5 is shown a modification of the rheostat of Fig. 4. In this form a mid-point of the rheostat resistance 74 is connected by a wire 92 to an arcuate contact 93; and the contact 93 and points on the resistor 74 are bridged by a rheostat arm 94. It is believed that it will be understood that with this arrangement, when the rheostat arm 94 is moved from the mid-position, the resistance in one of the generator fields will remain the same and that of the other will be reduced whereby one generator will tend to develop constant load while the other tends to develop increased load; but as will be obvious, the relative speeds of both generators and of both the shafts G1 and G2 will nevertheless be changed for the purposes referred to.

Similarly, as shown in Fig. 7 which is a modification of Fig. 6, energization of the field of one of the motors, M3 or M4, of Fig. 6, may be varied and the other left constant upon moving the rheostat arm 95 from the mid-position, to cause the speed of one motor to tend to decrease and the speed of the other motor to tend to remain constant. In either case, one of the shafts, G1 or G2 will run faster than the other, as hereinbefore explained.

In Fig. 8 is illustrated another means for controlling the relative speeds of the shafts G1 and G2, namely, a hydraulic transmission mechanism. Hydraulic transmissions are known by which the relative speeds of two shafts may be adjustably varied. In Fig. 8, 96 represents diagrammatically such a hydraulic transmission, and 97 and 98 the two shafts thereof, the relative speeds of these shafts being adjustable by the rotation, in one direction or the other, of a hand wheel 99. The shaft 97 is coupled to the shaft G2. The shaft 98 is connected to the shaft G1 by one-to-one ratio gearing 100—101. By turning the hand wheel 99, the relative speed at which the shafts G1 and G2 can run will be changed for the purposes described.

It is thought unnecessary herein to describe the mechanism details of the transmission 96, such being well-known. One type applicable to my invention as described comprises two piston and cylinder arrangements, each supplying liquid as a pump to the other as a motor, the pistons reciprocating upon rotation of shafts such as the shafts 97 and 98 and the rate of reciprocation of each being adjustably fixed relative to that of the other.

When connected to the shafts G1 and G2 as shown in Fig. 8 the torques applied on these shafts by the gearing will be resisted by the transmission 96 and they will be constrained thereby to run at the same or at different speeds determined by the adjustment by the hand wheel 99; and equal or unequal torques thereby developed on the shafts G1 and G2 will be reflected in equal or unequal opposing torques on the load shaft 40.

While in the foregoing I have illustrated and described various specific means for causing the shafts G1 and G2 to run at desired relative speeds, it is thought that other means for this purpose will be apparent to those skilled in this art without further expanding this specification by illustrating and describing the same. For example, friction brakes, operable manually or by power may be employed to variably retard the rotation of one or the other or both of the shafts G1 or G2, in a manner similar to that of the form of Fig. 8, and in this case one of the shafts G1 or G2, can be brought to zero speed if desired.

By reference to the several embodiments and modifications of my invention herein illustrated and described, it will be clear, and as described, that for any speed of one of the shafts (G1 or G2), a corresponding speed for the other one is predetermined by the interconnected elements of the arrangement. To vary the relative speed of these shafts, for the purposes described, they may be mechanically coupled together at a variable speed ratio, as in Figs. 1, 2, and 3; or they may be retarded by loads thereon, respectively, and one load adjusted to be equal to or greater than the other, as in Fig. 8; or their speeds may be controlled by electrical generators or electrodynamic units as in Figs. 4 and 5; or the shafts may be driven by auxiliary power units and the power adjusted to control their relative speeds, as in Figs. 6 and 7.

In all of the foregoing embodiments and modifications of my invention it will be noted that the power supplying motor may at all times be running at full speed so that a change of speed of the load, or the starting of the load from rest, occurs immediately, without the interposing of any time delay for the motor to start or accelerate or decelerate or change its speed; and that similarly the load may immediately be brought to rest or its speed reduced without the employment of any braking means other than that inherent in the apparatus as described.

In Figs. 2 and 3, it will be apparent that the relative speeds of the shafts G1 and G2 could be controlled by loads connected thereto for example by means of generators as shown for the generators G3 and G4 of Fig. 4; or as shown for the motors M3 and M4 of Fig. 6.

In the foregoing, certain pairs of mutually meshed gears have been illustrated and described as of equal diameter for convenience and simplicity of description, but it is to be understood that such gears may be of different diameters for obvious purposes.

Also, while in most cases, I may prefer to utilize for the motor M a constant speed motor, the speed of the motor M may be varied by well-known means, if desired, with obvious results.

The transmission described has particular advantages when the motor M is an electric motor, but it is to be understood that other types of motors for example internal combustion motors, may be utilized.

In some of the forms of my invention illustrated and described, the motor M is an alternating current motor, and in some it is a direct current motor, and this illustrates the applicability of the transmission to either direct current or alternating current power supply. The generators G3 and G4 of Fig. 4 and the motors M3 and M4 of Fig. 6 are shown as direct current generators and motors, and here again it will be understood by those skilled in the art how to substitute alternating current units for these generators and motors.

The differential gearings illustrated are of the type comprising bevel gears, but it is to be understood that the well known planetary type of gearing may be substituted therefor; and it is believed that it will be clear to those skilled in the art how this may be done without complicating this specification with drawings and description of the same.

My invention is not limited to the exact details of construction illustrated and described. Changes and modifications may be made within the spirit of my invention without sacrificing its advantages and my invention is comprehensive of all modifications and changes which come within the scope of the appended claims.

Subject matter illustrated and described herein but not claimed herein is being claimed in my co-pending application, Serial Number 541,882, filed June 24, 1944, for Speed controlled power units and transmission.

I claim:

1. In a power transmission, a first and a second differential gearing each comprising a spider rotatably supporting a pinion, and a pair of differential gears meshed with the pinion; a source of power connected to the two spiders to drive them in opposite directions, a differential gear of the first gearing and a differential gear of the second gearing being geared to a common load shaft; the remaining differential gears of the two gearings being connected each to a control shaft; and means to cause the load shaft optionally to remain at rest or to rotate comprising means to control the relative speeds of the said control shafts.

2. In a power transmission, a first and a second differential gearing each comprising a spider rotatably supporting a pinion and a pair of differential gears meshed with the pinion; a source of power connected to the two spiders to drive them in opposite directions, a differential gear of the first gearing and a differential gear of the second gearing being geared to a common load shaft; the remaining differential gears of the two gearings being connected each to a control shaft; and means to cause the load shaft optionally to remain at rest or to rotate in one direction or the other comprising means to control the relative speeds of the said control shafts.

3. In a power transmission, a first and a second differential gearing each comprising a spider rotatably supporting a pinion and a pair of diffential gears meshed with the pinion; a source of power connected to the two spiders to drive them in opposite directions, a differential gear of the first gearing and a differential gear of the second gearing being geared to a common load shaft; the remaining differential gears of the two gearings being connected each to a control shaft; and means to cause the load shaft optionally to remain at rest or to rotate at variable speed comprising means to variably control the relative speeds of the said control shafts.

4. In a power transmission, a first and a second differential gearing each comprising a spider rotatably supporting a pinion and a pair of differential gears meshed with the pinion; a source of power connected to the two spiders to drive them in opposite directions, a differential gear of the first gearing and a differential gear of the second gearing being geared to a common load shaft; the remaining differential gears of the two gearings being connected each to a control shaft; and means to cause the load shaft optionally to remain at rest or to rotate in one direction or the other comprising means to control the relative speeds of the said control shafts.

5. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the movement of the power delivery element comprising a variable speed ratio transmission and a third differential gearing connected to the two remaining differential gear elements for varying their relative speed.

6. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the relative speeds of the remaining two elements comprising a third differential gearing having two of its elements connected to the said remaining two elements respectively and a variable speed ratio transmission mechanism connecting one of the said remaining elements and the third element of the third differential gearing.

7. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the relative speeds of the said remaining two elements comprising a third differential gearing having two of its elements connected respectively to the said remaining two elements and having its third element connected to the power source, and a variable speed-ratio transmission mechanism connecting the said remaining two elements.

8. In a power transmission, two differential gearings each having three elements, namely, a spider element rotatably supporting a pinion, and two differential gear elements meshed with the pinion; a source of power connected to the spider element of each gearing to drive them; a driven rotary power delivery element connected to another of the elements of each gearing; and means to control the relative speeds of the two remaining elements to cause the power delivery element to rotate in one direction or the other or be at rest comprising an electric generator connected to each of them to be driven thereby, each generator having an armature circuit, and means to vary relatively the torque loads developed by the generators.

9. In a power transmission, two differential gearings each having three elements, namely, a spider element rotatably supporting a pinion, and two differential gear elements meshed with the pinion; a source of power connected to the spider element of each gearing to drive them; a driven rotary power delivery element connected to another of the elements of each gearing; and means to control the relative speeds of the two remaining elements to cause the power delivery element to rotate in one direction or the other or be at rest comprising an electric generator connected to each of them to be driven thereby and each generator having an armature circuit and a field and means to vary the field energization of at least one generator.

10. In a power transmission, two differential gearings each having three elements, namely, a spider element rotatably supporting a pinion, and two differential gear elements meshed with the pinion; a source of power connected to the spider element of each gearing to drive them; a driven rotary power delivery element connected to another of the elements of each gearing; and means to control the relative speeds of the two remaining elements to cause the power delivery element to rotate in one direction or the other or be at rest comprisnig an electric generator connected to each of them to be driven thereby, and each generator having an armature and a field, and means to increase the field energization of one generator and decrease that of the other.

11. In a power transmission, two differential gearings each having three elements, namely, a spider element rotatably supporting a pinion, and two differential gear elements meshed with the pinion; a source of power connected to the spider element of each gearing to drive them; a driven rotary power delivery element connected to another of the elements of each gearing; and means to control the relative speeds of the two remaining elements to cause the power delivery element to rotate in one direction or the other or be at rest comprising an electric generator connected to each of them to be driven thereby and each generator having an armature circuit and a field and means to vary the field energization of either generator while maintaining constant the field energization of the other.

12. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the relative speeds of the two remaining elements comprising respective auxiliary power-supplying means to drive them, at variable relative speeds.

13. In a power transmission, two differential gearings each having three elements, namely, a spider element rotatably supporting a pinion, and two differential gear elements meshed with the. pinion; a source of power connected to one of the elements of each gearing to drive them; a driven power delivery element connected to another of the elements of each gearing; and means to control the relative speeds of the two remaining elements comprising respective auxiliary power-supplying means to drive them, and means to vary the speed at which power is supplied by at least one of the auxiliary power means.

14. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the relative speeds of the two remaining elements comprising respective auxiliary power supplying means to drive them, and means to decrease the speed at which power is supplied by one of the auxiliary power means.

15. In a power transmission, two differential gearings each having three elements, namely, a spider element rotatably supporting a pinion, and two differential gear elements meshed with the pinion; a source of power connected to one of the elements of each gearing to drive them; a driven power delivery element connected to another of the elements of each gearing; and means to control the relative speeds of the two remaining elements comprising respective auxiliary power supplying means to drive them and means to increase the speed at which power is supplied by one of the auxiliary power means and decrease that of the other.

16. In a power transmission, a first and a second differential gearing each comprising a spider element rotatably supporting a pinion, and a pair of differential gear elements meshed with the pinion; power supplying means connected to the spider element of each gearing to drive them; another of the elements of each gearing being drivingly connected to a common load shaft in a manner to exert torques thereon in opposite directions; and means to control the torques to control movement of the load shaft comprising means to control the relative speeds of the remaining two elements of the gearings the said remaining elements having relative speeds at which the torques exerted on the load shaft are equal and opposite.

17. In a power transmission, two differential gearings each having three elements, namely, a spider element rotatably supporting a pinion, and two differential gear elements meshed with the pinion; power supplying means connected to the spider element of each gearing to drive them; a power delivery element connected to another of the elements of each gearing in a manner to receive torques therefrom in opposite directions; and means to control the relative speeds of the two remaining elements the said remaining elements having relative speeds at which the torques exerted on the load shaft are equal and opposite.

18. In a power transmission, two differential gearings each having three elements, namely, a spider element rotatably supporting a pinion, and two differential gear elements meshed with the pinion; power supplying means connected to the spider element of each gearing to drive them; a driven power delivery element connected to another of the elements of each gearing in a manner to receive torques therefrom in opposite directions; and adjustable control means to cause the two remaining elements to rotate at adjustable relative speeds the said remaining elements having relative speeds at which the torques exerted on the load shaft are equal and opposite.

19. In a power transmission, a first and a second differential gearing each comprising a spider rotatably supporting a pinion and a pair of differential gears meshed with the pinion; a source of power connected to the two spiders to drive them in opposite directions, a differential gear of the first gearing and a differential gear of the second gearing being drivingly connected to a common load shaft; means to cause the load shaft optionally to remain at rest or to rotate, comprising means to control the relative speeds of the two remaining differential gears of the two gearings.

20. In a power transmission, a first and a second differential gearing each comprising a spider rotatably supporting a pinion and a pair of differential gears meshed with the pinion; a source of power connected to the two spiders to drive them in opposite directions, a differential gear of the first gearing and a differential gear of the second gearing being drivingly connected to a common load shaft; means to cause the load shaft optionally to remain at rest or to rotate in one direction or the other, comprising means to control the relative speeds of the two remaining differential gears of the two gearings.

21. In a power transmission, two differential gearings each having three elements, namely, a spider element rotatably supporting a pinion and two differential gear elements meshed with the pinion; power supplying means connected to the spider element of each gearing to drive them; a driven power delivery element; another of the elements of each gearing being connected to the power delivery element to supply mutually opposing torques thereto; and means to control the relative speeds of the two remaining elements, comprising a power absorbing load connected to each of them and means to vary the loads relatively and the said remaining elements having speeds at which the said mutually opposing torques are equal.

22. In a power transmission, two differential gearings each having three elements, namely, a spider element rotatably supporting a pinion and two differential gear elements meshed with the pinion; power supplying means connected to the spider element of each gearing to drive them; a driven power delivery element; another of the elements of each gearing being connected to the power delivery element to supply mutually opposing torques thereto; and means to control the relative speeds of the two remaining elements comprising a power absorbing load connected to each of them and means to vary one of the loads and the said remaining elements having speeds at which the said mutually opposing torques are equal.

23. In a power transmission, two differential gearings each having three elements, namely, a spider element rotatably supporting a pinion and two differential gear elements meshed with the pinion; power supplying means connected to the spider element of each gearing to drive them; a driven power delivery element; another of the elements of each gearing being connected to the power delivery element to supply mutually opposing torques thereto; and means to control the relative speeds of the two remaining elements, comprising a power absorbing load connected to each of them and means to increase one load and decrease the other load and the said remaining elements having speeds at which the said mutually opposing torques are equal.

24. In a power transmission, two differential gearings each having three elements, namely, a spider element rotatably supporting a pinion and two differential gear elements meshed with the pinion; power supplying means connected to the spider element of each gearing to drive them; a driven power delivery element connected to another of the elements of each gearing in a manner to receive torque therefrom in opposite directions; means to control the relative speeds of the two remaining elements to control movement of the power delivery element, comprising an electric generator connected to each of the two remaining elements to be driven thereby; an electric armature circuit for each generator; and means to determine the respective torques developed at the generators by the current in their respective load armature circuits.

25. In a power transmission, two differential gearings each having three elements, namely, a spider element rotatably supporting a pinion and two differential gear elements meshed with the pinion; power supplying means connected to the spider element of each gearing to drive them; a driven power delivery element connected to another of the elements of each gearing in a manner to receive torque therefrom in opposite directions; means to control the relative speeds of the two remaining elements to control movement of the power delivery element, comprising an electric generator connected to each of the two remaining elements to be driven thereby; an electric armature circuit for each generator; and means to adjust the torques developed at the generators by currents in their respective armature circuits to cause them optionally to be equal or unequal.

26. In a power transmission, two differential gearings each having three elements, namely, a spider element rotatably supporting a pinion and two differential gear elements meshed with the pinion; respective auxiliary power supplying means continuously driving one of the elements of each gearing respectively; another of the elements of each gearing being connected to a power delivery element and exerting mutually opposing torques thereon; means causing the two remaining elements of the gearing to rotate continuously at determined speeds; and means to vary the relative speeds at which power is supplied by the respective auxiliary supplying means.

27. In a power transmission, two differential gearings each having three elements, namely, a spider element rotatably supporting a pinion and two differential gear elements meshed with the pinion; respective auxiliary power supplying means continuously driving one of the elements of each gearing respectively; another of the elements of each gearing being connected to a power delivery element and exerting mutually opposing torques thereon; means causing the two remaining elements of the gearing to rotate continuously at determined speeds; and means to vary the speed at which power is supplied by at least one of the auxiliary power means.

28. In a power transmission, two differential gearings each having three elements, namely, a spider element rotatably supporting a pinion and two differential gear elements meshed with the pinion; respective auxiliary power supplying means continuously driving one of the elements of each gearing respectively; another of the elements of each gearing being connected to a power delivery element and exerting mutually opposing torques thereon; means causing the two remaining elements of the gearing to rotate continuously at determined speeds; and means to decrease the speed at which power is supplied by one of the auxiliary power means.

29. In a power transmission, two differential gearings each having three elements, namely, a spider element rotatably supporting a pinion and two differential gear elements meshed with the pinion; respective auxiliary power supplying means continuously driving one of the elements of each gearing respectively; another of the elements of each gearing being connected to a power delivery element and exerting mutually opposing torques thereon; means causing the two remaining elements of the gearing to rotate continuously at determined speeds; and means to increase the speed at which power is supplied by one of the auxiliary power means and decrease that of the other.

30. In a power transmission, two differential gearings each having three elements, namely, a spider element rotatably supporting a pinion, and two differential gear elements meshed with the pinion; a source of power connected to the spider element of each gearing to drive them; a driven power delivery element connected to another of the elements of each gearing; and means to control the relative speeds of the two remaining elements; the two remaining elements having speeds at which said connected elements apply mutually opposing equal torques to the power delivering element and other alternative relative speeds at which the torque applied by either of said connected elements alternatively overpowers that applied by the other and drives the power delivering element alternatively in the forward or reverse direction.

31. In a power transmission, two differential gearings each having three elements, namely, a spider element rotatably supporting a pinion, and two differential gear elements meshed with the pinion; a source of power connected to the spider element of each gearing to drive them; a driven power delivery element connected to another of the elements of each gearing; and adjustable control means to cause the two remaining elements to rotate at adjustable relative speeds; the two remaining elements having speeds at which said connected elements apply mutually opposing equal torques to the power delivering element and other alternative relative speeds at which the torque applied by either of said connected elements alternatively overpowers that applied by the other and drives the power delivering element alternatively in the forward or reverse direction.

32. In a power transmission, two differential gearings each having three elements, namely, a spider element rotatably supporting a pinion, and two differential gear elements meshed with the pinion; a source of power connected to the spider element of each gearing to drive them; a driven power delivery element connected to another of the elements of each gearing; and means to control the relative speeds of the two remaining elements comprising a power-absorbing load connected to each of them, and means to vary the loads relatively; the two remaining elements having speeds at which said connected elements apply mutually opposing equal torques to the power delivering element and other alternative relative speeds at which the torque applied by either of said connected elements alternatively overpowers that applied by the other and drives the power delivering element alternatively in the forward or reverse direction.

33. In a power transmission, two differential gearings each having three elements, namely, a spider element rotatably supporting a pinion, and two differential gear elements meshed with the pinion; a source of power connected to the spider element of each gearing to drive them; a driven power delivery element connected to another of the elements of each gearing; and means to control the relative speeds of the two remaining elements comprising a power-absorbing load connected to each of them and means to vary one of the loads; the two remaining elements having speeds at which said connected elements apply mutually opposing equal torques to the power delivering element and other alternative relative speeds at which the torque applied by either of said connected elements alternatively overpowers that applied by the other and drives the power delivering element alternatively in the forward or reverse direction.

34. In a power transmission, two differential gearings each having three elements, namely, a spider element rotatably supporting a pinion, and two differential gear elements meshed with the pinion; a source of power connected to the spider element of each gearing to drive them; a driven power delivery element connected to another of the elements of each gearing; and means to control the relative speeds of the two remaining elements comprising a power-absorbing load connected to each of them and means to increase one load and decrease the other load; the two remaining elements having speeds at which said connected elements apply mutually opposing equal torques to the power delivering element and other alternative relative speeds at which the torque applied by either of said connected elements alternatively overpowers that applied by the other and drives the power delivering element alternatively in the forward or reverse direction.

35. In a power transmission, a first and a second differential gearing each comprising a spider rotatably supporting a pinion and a pair of differential gears meshed with the pinion; a source of power connected to the two spiders to drive them; a differential gear of the first gearing and a differential gear of the second gearing being drivingly connected to a common load shaft; the remaining differential gears of the two gearings being connected each to a control shaft; and means to cause the load shaft optionally to remain at rest or to rotate in one direction or the other comprising means to control the relative speeds of the said control shafts.

LEV A. TROFIMOV.